United States Patent Office 3,034,633
Patented May 15, 1962

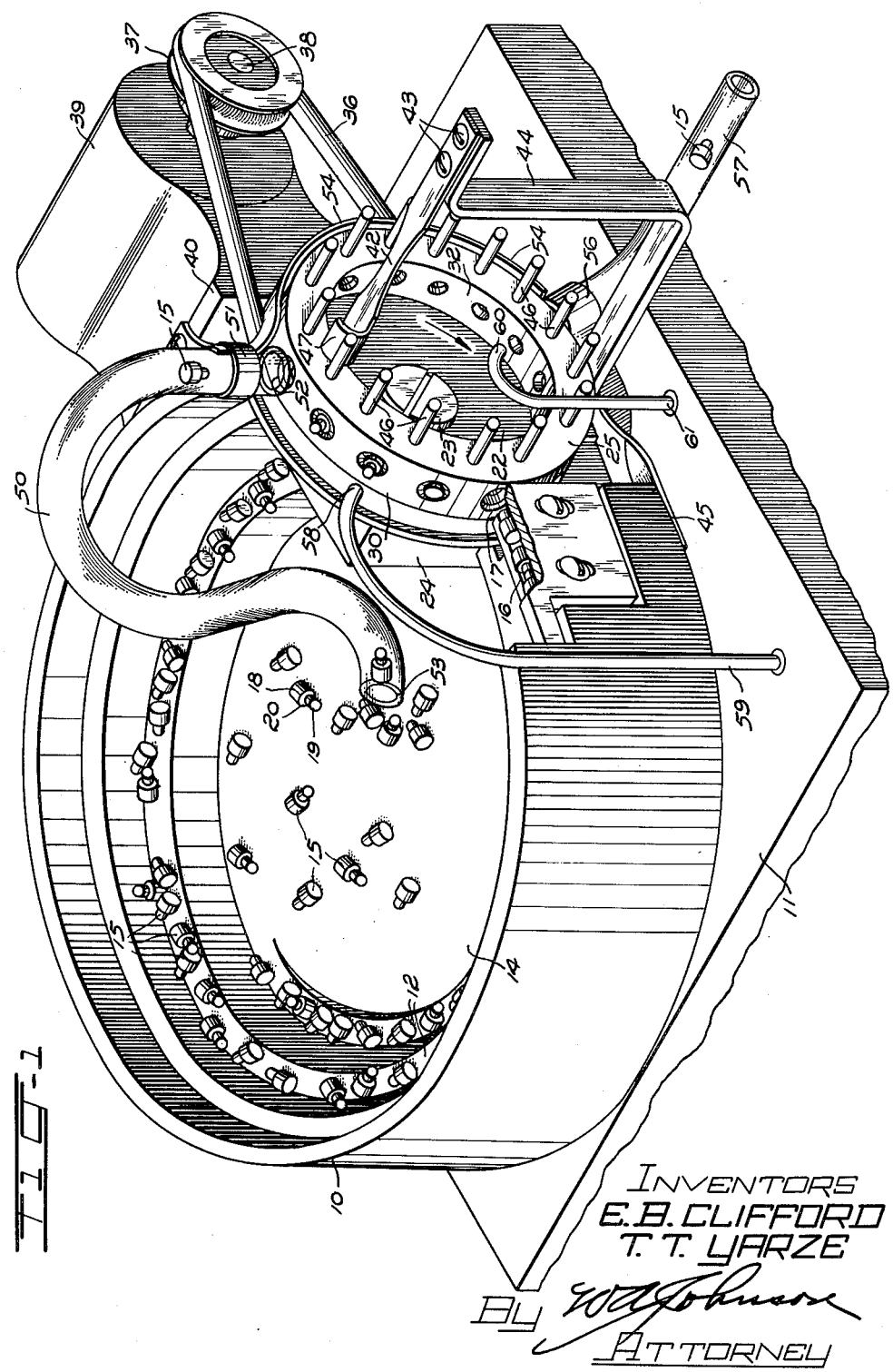

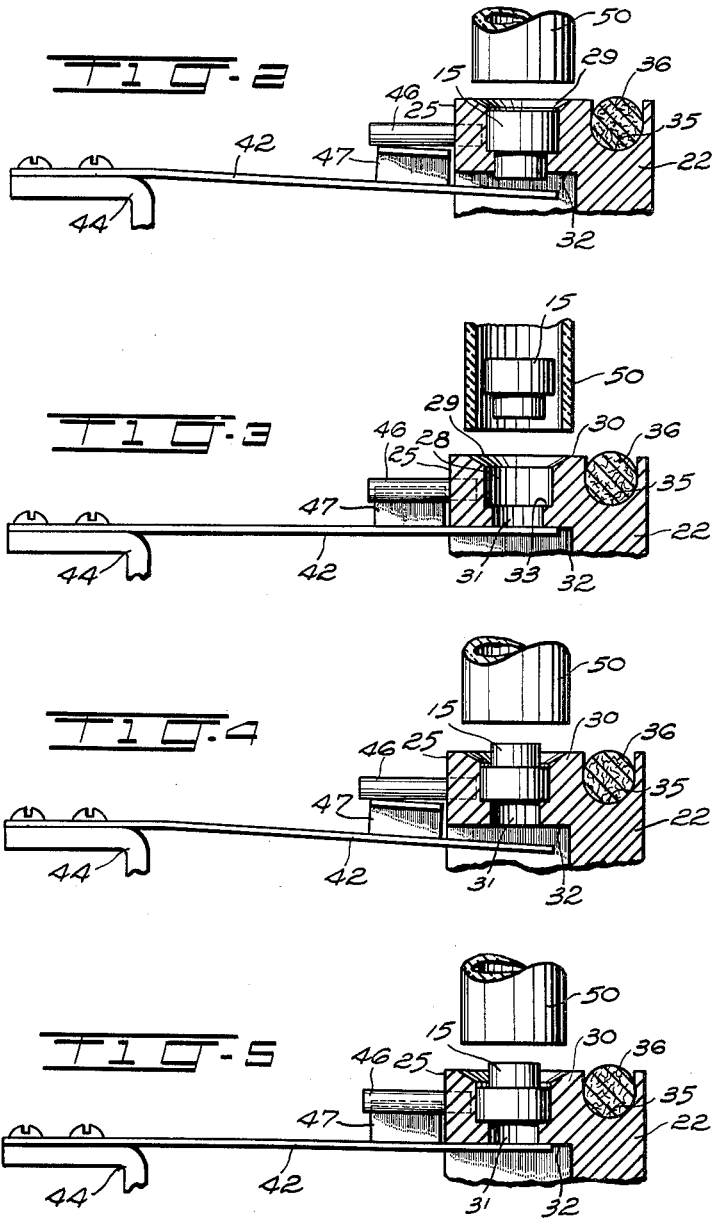

---

3,034,633
APPARATUS FOR FEEDING ARTICLES
Eugene B. Clifford, West Orange, and Ted T. Yarze, East Orange, N.J., assignors to Western Electric Company, Incorporated, a corporation of New York
Filed May 8, 1961, Ser. No. 108,568
9 Claims. (Cl. 198—33)

This invention relates to apparatus for feeding articles, particularly articles having end portions of different sizes.

In the manufacture of certain types of electrical units requiring spring pile-ups such as telephone keys, relays, and the like, spacers formed of dielectric material such as rubber, are mounted between certain of the springs to serve as separators. These articles are small and when they are manually oriented and fed to the springs, these operations consume a considerable proportion of the total assembly time. Furthermore, their particular contours prevent proper orientation of the articles by the conventional feeding units known as vibratory feeders. The articles are cylindrical in general contour and of predetermined lengths, but the ends of the articles are of different diameters including a small end portion and a large end portion and although it has been determined that certain types of machines may be employed to insert the articles or spacers in apertures of their springs, the articles must be fed to these machines in a definite order.

The object of the present invention is an apparatus which, although simple in structure, is highly efficient in receiving and feeding properly oriented articles.

In accordance with the object, the apparatus for feeding articles is disposed in combination with a unit adapted to advance articles having large and small end portions free of orientation of the articles, but end-to-end along a trough and through an exit end of the trough. An annular element with apertures therein is rotated to move the apertures successively into alignment with the exit end of the trough, to receive the articles singly in the apertures, the apertures being formed with ends of different sizes to permit incorrectly positioned articles to extend through the apertures where, at a given location, means is operated to force the incorrectly positioned articles free of the element.

The apparatus also includes a guard positioned adjacent the element to retain all of the properly positioned articles in their apertures until they reach an unloading station where a feeding guide receives the articles and directs them successively away from the apparatus.

Other objects and advantages will be apparent from the following detailed description when considered in conjunction with the accompanying drawings wherein:

FIG. 1 is an isometric view of the apparatus shown in combination with an article advancing unit;

FIG. 2 is a fragmentary sectional view illustrating an incorrectly positioned article in the wheel and the ejector about to be operated;

FIG. 3 is a view of the structure shown in FIG. 2 shortly after the operation of the ejector;

FIG. 4 is a fragmentary sectional view similar to that shown in FIG. 2 but with an article correctly positioned in the wheel; and FIG. 5 is a fragmentary sectional view illustrating the operation of the ejector without disturbing the correctly positioned article.

In the present illustration, a unit such as a conventional vibratory feeder 10 is mounted on a support 11 and has an inclining spiral track 12 adjacent its inner periphery and surrounding its vibrating central portion 14 to cause the articles 15 to move along the track and eventually approach and move through a downwardly slanting trough 16 and an exit end 17 thereof.

In the present instance, the articles 15 are cylindrical in general contour having large and small end portions 18 and 19, respectively, and an intermediate lateral surface 20.

The apparatus for feeding and orienting the articles includes an annular element in the form of a wheel 22 mounted for rotation at 23 on a bracket 24 and having an annular rim 25 provided with spaced radially extending apertures of the contours shown in FIGS. 2 to 5, inclusive. For example, the aperture shown in FIG. 3 has a large outer portion 28 open through a beveled portion 29 to an outer periphery 30 of the rim 25. The aperture also has a smaller portion 31 open through the inner periphery 32 of the rim, the two portions providing a lateral intermediate surface 33 on which either the outer end of the large portion of each article may rest, if properly oriented, or on which the intermediate surface 20 of each article may rest if incorrectly oriented.

The wheel 22 is provided with an annular groove 35 to receive a belt 36 which extends around a pulley 37 on a shaft 38 of a motor 39. The motor 39 is mounted on a bracket 40 and is driven at a desired speed to rotate the wheel at a speed capable of receiving the successive articles from the trough 16 in the apertures of the wheel.

An ejector 42 is a resilient spring-like member having one end fixed at 43 to a bracket 44 mounted at 45, while the other end is positioned adjacent to the inner periphery 32 normally. A series of pins 46 positioned in advance of their respective apertures of the wheel 22 mounted on the rim 25 and extending laterally therefrom, serve as cams in conjunction with a projection 47 mounted on the ejector 42 to flex the ejector, as illustrated in FIGS. 2 and 4, as the cams move singly transversely of the ejector so that as the corresponding aperture of the wheel moves into alignment with the ejector, the ejector will be released, as shown in FIG. 3. At this instant, the free end of the ejector will strike the area of the inner periphery adjacent the aperture registering therewith and an incorrectly positioned article, if such is disposed in that aperture, to force the incorrectly positioned article out of the wheel.

A guide tube 50, of the contour shown in FIG. 1, is movably supported by a bracket 51 so that its entrance end 52 will be located in alignment with the aperture at the ejecting position and its exit end 53 may be located at any desired position within the unit 10. The bracket 51 supports a retaining guard 54 which is curved about the annular element 25 or rim of the wheel from the ejecting position adjacent the ejector 42 and a discharging position adjacent an entrance end 56 of a feeding guide 57 to hold the correctly positioned articles in their apertures until they can drop into the feeding guide 57. An air nozzle 58, extending from an air line 59, is directed toward the outer periphery of the rim 25 to assure complete setting of the articles on the surface 33 of each aperture, this being of particular importance regarding the incorrectly positioned articles to assure their projection through the inner periphery 32 of the rim, as shown in FIG. 2. Another air nozzle 60, extending from an air line 61, is positioned near the feeding guide 57 to assure the articles leaving the wheel and moving through the feeding guide.

*Operation*

With the unit 10 in operation, the articles 15 will be moved end-to-end with either end leading successively to the trough 16 and through the exit end 17 toward the outer periphery 30 of the element or rim 25 of the wheel. The outer periphery 30 has a smooth surface on which the articles may ride without disturbing their positions in the trough which, in actual practice, is partially covered to held the articles against being moved out of alignment by their engagement with the outer periphery 30. Furthermore, the speed of the wheel by the energization of the motor 39 is such that the force tending to advance the articles will, through the assistance of the tapered surface 29, permit the articles to enter the successive apertures regardless of their positions. If the articles enter the apertures in the desired positions with the small end portions 19 extending outwardly and the larger end portions 18 resting on the lateral surfaces 33 of the aperture, the articles will continue movement with the element or wheel past the ejecting station and will be discharged from the wheel into the tube with the smaller ends in the lead as they move through the tube or feeding guide 57 to an apparatus, not shown, which will mount it in its particular structure. However, the articles which enter the apertures incorrectly or with the smaller end portions in the lead, will be caused to be seated in their apertures, as illustrated in FIG. 2, with a length of the smaller end projecting beyond the inner periphery 32.

The ejector 42 is operated to strike the inner periphery of the rim adjacent each aperture, this being the result of the cam-like pins 46 riding successively over the projection 47, causing flexing of the ejector 42 and releasing the ejector when the next aperture is moved into general alignment therewith. As a result, all articles incorrectly positioned in their apertures, with their smaller ends projecting below the inner periphery 32, will receive a blow from the ejector sufficient to force the article from its aperture, as illustrated in FIGS. 1 and 3, and cause it to travel through the tube 50 back into the feeder 10. Therefore, only correctly oriented or positioned articles continue their travel with the element or wheel to the feeding guide 57 where they are caused to leave the element or wheel through gravity and/or the assistance of a jet of air from the nozzle 60.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for feeding like articles having opposing ends of different sizes identified as smaller and larger ends, in combination with a unit having an exit end and operable to move the articles end-to-end through the exit with either end leading, the apparatus comprising an annular element having an outer periphery, an inner periphery and spaced radially positioned apertures therein having inlet and outlet ends of different sizes opening respectively through the outer and inner peripheries, means to support the element for rotation adjacent the exit end of the unit so that the apertures register successively with the exit end and receive articles singly therefrom, means to rotate the element, the articles entering the apertures with their larger ends leading will be stopped in their apertures short of the inner periphery while the articles entering the apertures with their smaller ends leading will extend through their apertures and beyond the inner periphery, and means operable at an ejecting position to eject all articles extending beyond the inner periphery from the element.

2. The apparatus according to claim 1 in which a feeding guide adapted to receive the remaining articles in the element has an entrance end for the articles, and means to support the feeding guide with its entrance end positioned to register with the successive apertures.

3. An apparatus according to claim 2 in which an arcuate guard is mounted adjacent the element and extends between the ejecting position and the feeding guide to hold articles against leaving apertures of the element.

4. An apparatus according to claim 1 in which a return tube has an entrance end and an exit end, and means to mount the return tube at a position with its entrance end disposed adjacent the ejecting position, to receive the ejected articles, and its exit end positioned to return the ejected articles to the unit.

5. An apparatus according to claim 1 in which the ejecting means includes a resilient member having a fixedly mounted end spaced from the element and a free end disposed normally adjacent the inner periphery, and means to flex the member to move the free end thereof away from the inner periphery and release the member so that the free end will strike all smaller ends of articles which extend beyond the inner periphery.

6. An apparatus according to claim 5 in which the means to flex the resilient member includes a cam mounted on the element in advance of each aperture adapted to flex the resilient member to move the free end thereof away from the inner periphery and free the resilient member when the aperture is moved into the ejecting position.

7. An apparatus according to claim 2 in which an air nozzle is aligned with the successive apertures aligned with the entrance end of the feeding guide to force articles from the apertures into the feeding guide.

8. An apparatus for feeding articles in combination with a unit adapted to advance like articles having large and small end portions end-to-either-end along a trough and through an exit end of the trough, comprising a wheel mounted for rotation adjacent the exit end of the trough, an annular rim for the wheel having like radially extending apertures therein with portions of different sizes including larger portions extending through the outer periphery and smaller portions extending through the inner periphery of the rim joined by an intermediate lateral surface so that articles entering the apertures with their large end portions leading will terminate at the lateral surfaces and so that articles entering the apertures with their small ends leading will rest on the lateral surface with their small end portions extending through the inner periphery of the rim, and an ejector operable to force all articles extending through the inner periphery of the rim from the wheel.

9. An apparatus according to claim 8 in which an air nozzle is mounted at a fixed position adjacent the wheel to cause jets of air to strike the successive articles and seat them on the intermediate lateral surfaces of their apertures.

References Cited in the file of this patent

UNITED STATES PATENTS 2,932,377  Ashby _____ Apr. 12, 1960